US007028250B2

(12) United States Patent
Ukrainczyk et al.

(10) Patent No.: US 7,028,250 B2
(45) Date of Patent: Apr. 11, 2006

(54) SYSTEM AND METHOD FOR AUTOMATICALLY CLASSIFYING TEXT

(75) Inventors: Igor Ukrainczyk, Mountain View, CA (US); Max Copperman, Santa Cruz, CA (US); Scott B. Huffman, Redwood City, CA (US)

(73) Assignee: Kanisa, Inc., Cupertino, CA (US)

( * ) Notice: Subject to any disclaimer, the term of this patent is extended or adjusted under 35 U.S.C. 154(b) by 737 days.

(21) Appl. No.: 09/864,156

(22) Filed: May 25, 2001

(65) Prior Publication Data

US 2002/0022956 A1 Feb. 21, 2002

Related U.S. Application Data

(60) Provisional application No. 60/206,975, filed on May 25, 2000.

(51) Int. Cl.
*G06F 15/00* (2006.01)

(52) U.S. Cl. .................................................. 715/500

(58) Field of Classification Search .................. 706/42, 706/20; 704/275, 232, 219, 332; 715/500, 715/531, 513, 417, 523, 530; 707/5
See application file for complete search history.

(56) References Cited

U.S. PATENT DOCUMENTS

| | | | | |
|---|---|---|---|---|
| 4,817,623 A | * | 4/1989 | Stoddart et al. | 600/477 |
| 4,833,610 A | * | 5/1989 | Zamora et al. | 707/5 |
| 4,918,621 A | | 4/1990 | Nado et al. | 364/513 |
| 4,931,951 A | * | 6/1990 | Murai et al. | 706/61 |
| 5,073,867 A | * | 12/1991 | Murphy et al. | 706/42 |
| 5,257,394 A | * | 10/1993 | Asai | 712/7 |
| 5,278,911 A | * | 1/1994 | Bickerton | 704/232 |
| 5,309,359 A | | 5/1994 | Katz et al. | 364/419.19 |
| 5,325,533 A | * | 6/1994 | McInerney et al. | 717/107 |
| 5,404,295 A | | 4/1995 | Katz et al. | 364/419.19 |
| 5,553,226 A | | 9/1996 | Kiuchi et al. | 395/161 |
| 5,555,408 A | | 9/1996 | Fujisawa et al. | 395/600 |
| 5,568,640 A | | 10/1996 | Nishiyama et al. | 395/600 |
| 5,594,837 A | | 1/1997 | Noyes | 395/63 |
| 5,600,831 A | | 2/1997 | Levy et al. | 395/602 |
| 5,621,857 A | * | 4/1997 | Cole et al. | 704/232 |

(Continued)

FOREIGN PATENT DOCUMENTS

JP    07160658 A    *    6/1995

(Continued)

OTHER PUBLICATIONS

"(Kanisa) Intelligized Business Processes", (1998),12 pgs.

(Continued)

*Primary Examiner*—Stephen Hong
*Assistant Examiner*—Kyle Stork
(74) *Attorney, Agent, or Firm*—Schwegman, Lundberg, Woessner & Kluth, P.A.

(57) ABSTRACT

A method is provided for automatically classifying text into categories. In operation, a plurality of tokens or features are manually or automatically associated with each category. A weight is then coupled to each feature, wherein the weight indicates a degree of association between the feature and the category. Next, a document is parsed into a plurality of unique tokens with associated counts, wherein the counts are indicative of the number of times the feature appears in the document. A category score representative of a sum of products of each feature count in the document times the corresponding feature weight in the category for each document is then computed. Next, the category scores are sorted by perspective, and a document is classified into a particular category, provided the category score exceeds a predetermined threshold.

11 Claims, 9 Drawing Sheets

U.S. PATENT DOCUMENTS

| | | | |
|---|---|---|---|
| 5,625,748 A | 4/1997 | McDonough et al. | |
| 5,625,767 A | 4/1997 | Bartell et al. | 395/140 |
| 5,628,009 A | 5/1997 | Kikuta et al. | 395/610 |
| 5,630,125 A | 5/1997 | Zellweger | 395/614 |
| 5,644,740 A | 7/1997 | Kiuchi | 395/357 |
| 5,655,116 A | 8/1997 | Kirk et al. | 395/601 |
| 5,659,725 A | 8/1997 | Levy et al. | 395/600 |
| 5,671,333 A | 9/1997 | Catlett et al. | |
| 5,724,571 A | 3/1998 | Woods | 395/605 |
| 5,758,322 A * | 5/1998 | Rongley | 704/275 |
| 5,761,385 A * | 6/1998 | Quinn | 706/20 |
| 5,768,578 A | 6/1998 | Kirk et al. | 395/611 |
| 5,787,417 A | 7/1998 | Hargrove | 707/4 |
| 5,794,050 A | 8/1998 | Dahlgren et al. | 395/708 |
| 5,809,499 A | 9/1998 | Wong et al. | 707/6 |
| 5,819,258 A | 10/1998 | Vaithyanathan et al. | 707/2 |
| 5,835,918 A * | 11/1998 | Walls et al. | 715/513 |
| 5,845,270 A | 12/1998 | Schatz et al. | 706/11 |
| 5,878,423 A | 3/1999 | Anderson et al. | 707/100 |
| 5,924,108 A * | 7/1999 | Fein et al. | 715/531 |
| 5,930,748 A * | 7/1999 | Kleider et al. | 704/219 |
| 5,991,756 A | 11/1999 | Wu | 707/3 |
| 6,151,592 A * | 11/2000 | Inazumi | 706/16 |
| 6,169,986 B1 | 1/2001 | Bowman et al. | 707/5 |
| 6,233,575 B1 | 5/2001 | Agrawal et al. | 707/6 |
| 6,256,627 B1 | 7/2001 | Beattie et al. | 707/6 |
| 6,282,538 B1 | 8/2001 | Woods | 707/5 |
| 6,297,824 B1 | 10/2001 | Hearst et al. | 345/357 |
| 6,301,579 B1 | 10/2001 | Becker | 707/102 |
| 6,314,420 B1 | 11/2001 | Lang et al. | 707/3 |
| 6,317,722 B1 * | 11/2001 | Jacobi et al. | 705/14 |
| 6,434,550 B1 | 8/2002 | Warner et al. | 707/3 |
| 6,745,238 B1 * | 6/2004 | Giljum et al. | 709/219 |

FOREIGN PATENT DOCUMENTS

| | | |
|---|---|---|
| WO | WO-97/38378 | 10/1997 |
| WO | WO-99/18526 | 4/1999 |

OTHER PUBLICATIONS

"FAQ—Connect Care by ProAmerica", (1998),3 pgs.
"IBM Version 2—Intelligent Miner for Data", (1998),2 pgs.
"IBM Version 2.1—Intelligent Miner for Data", (1998),2 pgs.
"IBM's Data Mining Technology", (1996),25 pgs.
"Industry Solutions: Markets and Applications", (Nov. 19, 1998),3 pgs.
"Kana Communications—Success Story: eBay", (Nov. 1998),4 pgs.
"Kana Communications—Success Story: Netscape", 4 pgs.
"ProAmerica Connect Care—The First Customer Care Software", 12 pgs.
"ProAmerica Redefines Customer Care with Visual Warehouse", *IBM*, (Feb. 1998),2 pgs.
"Quality Connect", *Web Page*, (1998).
"Sales Connect", *Web Page*, (1998).
"SCM—Theory of Customer Care, ProAmerica", (1996),28 pgs.
"Support Connect", *Web Page*, (1998).
"Survey Connect", *Web Page*, (1998).
"Using the Intelligent Miner in a Simple Scenario", *Version 2.1.1, IBM*, (Apr. 1998),35 pgs.
"Web Connect", *webpage*, (Nov. 1998),2 pgs.
Buckley, James P., "A Hierarchical Clustering Strategy for Very Large Fuzzy Databases", *IEEE Int'l Conf. on Systems, Man and Cybernetics*, 4, (1995),3573-3578.
Li, Wen-Syan , "PowerBookmarks: A System for Personalizable Web Information Organization, Sharing, and Management", *Proc. ACM SIGMOD Int'l. Conf. on Management of Data*, 28, (1999),565-567.
Magennis, Mark , "The Potential and Actual Effectiveness of Interactive Query Expansion", *Annual Int'l. ACN-SIGIR Conf. on Research and Development in Information Retrieval*, (1997),324-332.
Stodder, David , "Toward Universal Business Intelligence: An Interview with Janet Perna", (1997),6 pgs.
Tkach, Daniel S., "Information Mining with the IBM Intelligent Miner Family", *An IBM Software Solutions White Paper*, (1998),1-29.
Wong, Jacqueline W., "Action: Automatic Classification for Full-Text Documents", *Association of Computing Machinery SIGIR Forum*, 30, (1996),26-41.

* cited by examiner

| TERM ID (710) | TAXONOMY NAME (720) | CONCEPT SHORT NAME (730) | GRANULARITY (740) | FLAGS (750) | WEIGHT (760) |
|---|---|---|---|---|---|
| | | | CONCEPT | | |
| | | | TAXONOMY | | |
| | | | | | |
| | | | | | |
| | | | | | |
| | | | | | |

*Fig. 7*

$$\left[\, C_i \,\right] = \left[\, W_{ij} \,\right] * \left[\, f_j \,\right]$$

$$C_i = \sum W_{ij} * f_j$$

SYSTEM AND METHOD FOR AUTOMATICALLY CLASSIFYING TEXT

RELATED APPLICATIONS

The following application is relied upon and hereby incorporated by reference in this application:

U.S. Provisional Application No. 60/206,975, entitled "System and Method for Providing a Text Classifier."

TECHNICAL FIELD

The present invention is directed to text classification and, more particularly, to a computer-based system for text classification that provides a resource that can be utilized by external applications for text classification.

BACKGROUND

Throughout the entire period of recorded history, people have memorialized their thoughts, actions, hopes and dreams on a daily basis. Prior to the latter part of the 20$^{th}$ century, this recorded history was typically written for exchange between human beings without any expectation that the information would be stored in a machine or otherwise converted into a machine-readable format. At that time, archives of this information resided in countless document depositories, complicating access to, and retrieval of the information contained in the documents. In the past 30 years, efforts have been underway to archive these "natural language" documents on various other media. More specifically, the development of the personal computer has led to the creation of an unprecedented amount of machine-readable information. Improvements in scanner technology have additionally led to the conversion of documents from hardcopy documents into machine-readable documents. This technology, together with similar advances in mass storage has led to the conversion of natural language documents into machine-readable documents at an unprecedented level. Today, documents generated by a computer (e.g., word processor, spreadsheet, or database software), can now be stored directly on magnetic or optical media, further increasing the opportunities for subsequent access and retrieval of them.

The growing volume of publicly available, machine-readable textual information makes it increasingly necessary for businesses to automate the handling of such information to stay competitive. Other establishments like educational institutions, medical facilities and government entities can similarly benefit from this automated handling of information. By automating the handling of text, these organizations can decrease costs and increase the quality of the services performed that require access to textual information.

One approach for automating the conversion of natural language documents into machine-readable text is to use a text classification system which, given a portion of data, can automatically generate several categories describing major subject matter contained in the data. Automated text classification systems identify the subject matter of a piece of text as belonging to one or more categories of a potentially large, predefined set of categories. Text classification also includes a class of applications that can solve a variety of problems in the indexing and routing of text. Efficient routing of text is particularly useful in large organizations where there is a large volume of individual pieces of text that needs to be sent to specific persons (e.g., technical support specialists inside a large customer support center). Text routing also plays a pivotal role in the area of text retrieval in response to user queries on the Internet.

A number of different approaches have been developed for automatic text processing of user queries. One approach is based upon information retrieval techniques utilizing Boolean keyword searches. While this approach is efficient, it suffers from problems relating to the inaccuracy of the retrieved information. A second approach borrows natural language processing using deep linguistic knowledge from artificial intelligence technology to achieve higher accuracy. While deep linguistic processing improves accuracy based upon an analysis of the meaning of input text, speed of execution is slow and range of coverage is limited. This is especially problematic when such techniques are applied to large volumes of text.

Another approach is rule-based text classification systems which classify documents according to rules written by people about the relationship between words in the documents and the classification categories. Text classification systems which rely upon rule-base techniques also suffer from a number of drawbacks. The most significant drawback is that such systems require a significant amount of knowledge engineering to develop a working system appropriate for a desired text classification application. It becomes more difficult to develop an application using rule-based systems because individual rules are time-consuming to prepare, and require complex interactions. A knowledge engineer must spend a large amount of time tuning and experimenting with the rules to arrive at the correct set of rules to ensure that the rules work together properly for the desired application.

Another approach to text classification is to use statistical techniques to enable the system to "learn" from the input text. In essence, these systems develop a statistical model of the vocabulary used in the different classification categories. Such systems take training data in the form of documents classified by people into appropriate categories, and in a training phase, develop the statistical model from these documents. These statistical models quantify the relationships between vocabulary features (words and phrases) and classification categories. Once developed, these statistical models may be used to classify new documents. In systems that do utilize a learning component (a training phase), the narrower and more closely related the categories are, the more training data is needed. Exacerbating the problem is the fact that in most applications, training data is hard to locate, often does not provide adequate coverage of the categories, and is difficult and time-consuming for people to categorize, requiring manual effort by experts in the subject area (who are usually scarce and expensive resources). Further, badly categorized training data or correctly categorized training data with extraneous or unusual vocabulary degrades the statistical model, causing the resulting classifier to perform poorly.

Of the prior art systems that utilize training data, most do not have the capability to interactively take advantage of human knowledge. History has shown that a person will often know what results from sound training data, what results from poor training data, and what may not be adequately expressed in the training data. Those prior art systems that do utilize user input, do not allow users to directly affect the quantified relationship between vocabulary features and classification categories, but simply allow the user to change the training data. Yet another shortcoming of prior art text classification systems lies in the fact that they only deal with categories which are from a single perspective. Consider three perspectives on news stories:

geography (where the story took place), business entities (what companies the story is about) and topic. To categorize stories according to geographic location would require a different classifier than one that classified the stories according to business entities, which in turn would require a different classifier than one that classified stories according to their topic. These classifiers cannot interact, consequently one cannot benefit from the other. For example, a false correlation between text about Germany and the category "pharmaceutical companies" may arise in the business entity classifier because many pharmaceutical companies are located in Germany. The fact that text about Germany is known to be an important feature of geographical classification (by the geography classifier) cannot be used to ameliorate the false correlation in the business entity perspective.

Thus, there is a need to overcome these and other problems of the prior art and to provide an effective method for classifying text in which user knowledge may be utilized very early in the construction of the statistical model. The present invention, as illustrated in the following description, is directed to solving one or more of the problems set forth above.

SUMMARY OF THE INVENTION

In accordance with the present invention, a method for simultaneously classifying at least one document into a plurality of categories is disclosed. The method comprises the steps of associating a plurality of category features with each category, wherein each category feature represents one of a plurality of tokens; producing a category vector for each category, wherein each category vector includes the plurality of category features with a weight corresponding to each category feature, wherein the weight is indicative of a degree of association between the category feature and the category; associating a plurality of document features with each document, wherein each document feature represents one of a plurality of tokens found in the document; producing a feature vector for each document, wherein each feature vector includes the plurality of document features with a count corresponding to each document feature, wherein the count is indicative of the number of times the document feature appears in the document; multiplying the category vector by the document vector, in accordance with the mathematical convention of multiplication of a vector by a vector, to produce a plurality of category scores for each document; and for each perspective, classifying a document into a category provided the category score exceeds a predetermined threshold.

In accordance with another embodiment of the present invention, a method for associating one of a plurality of features with at least one of a plurality of categories is disclosed. The method comprises the steps of manually or automatically associating a plurality of features with at least one category, wherein the plurality of features contribute to a decision to classify a document into said at least one category.

BRIEF DESCRIPTION OF THE DRAWINGS

FIG. 7 is a block diagram depicting the operation of a feature finder in accordance with one embodiment of the present invention;

FIG. 9 is a mathematical representation of the process of topic spotting.

DETAILED DESCRIPTION

Figure 1:
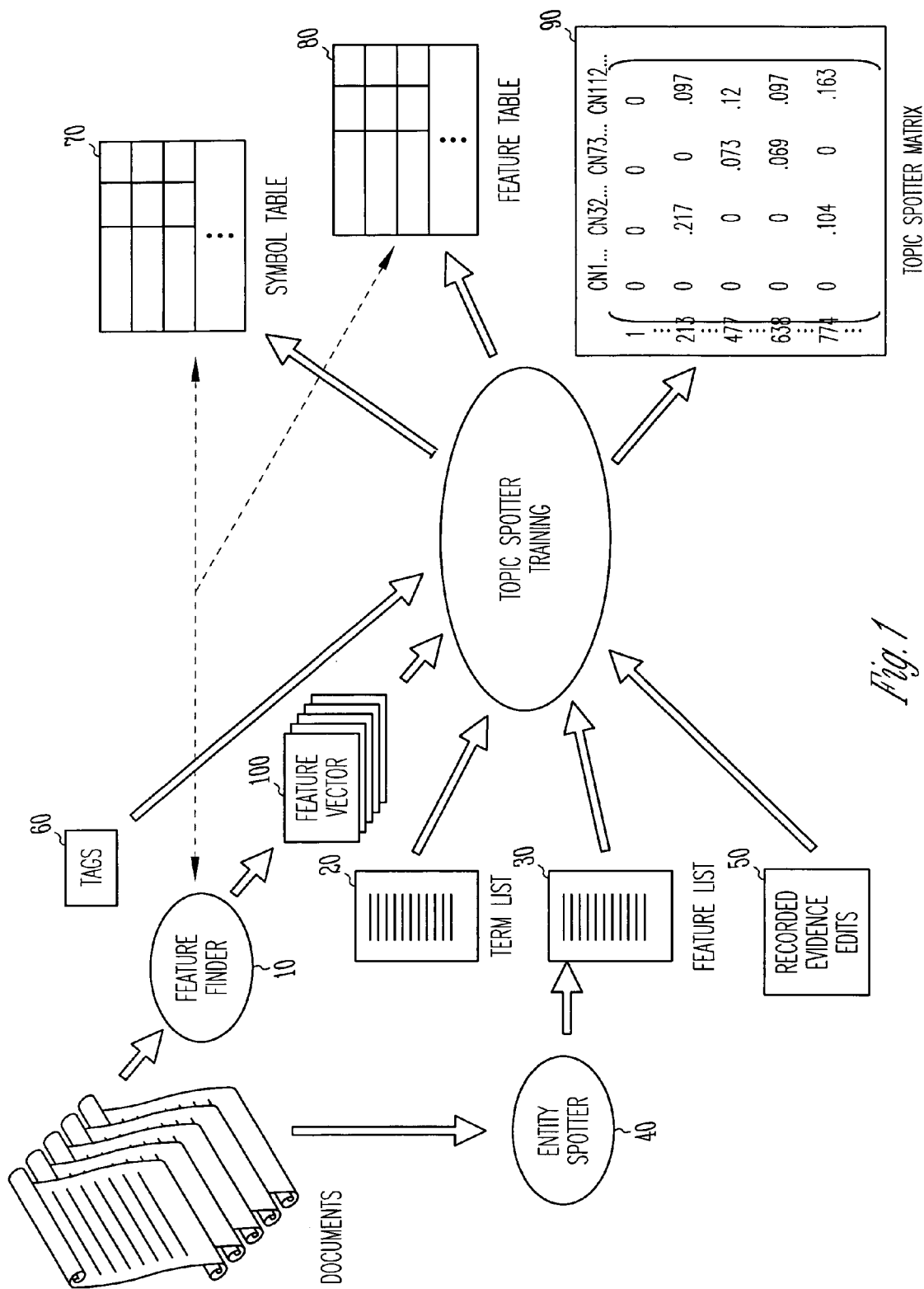
FIG. 1, is shown a block diagram of the general layout of the present invention.

In the following detailed description, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that algorithmic changes may be made without departing from the scope of the present invention. The following detailed description is, therefore, not to be taken in a limited sense.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

Referring now to the drawings, in which like numerals represent like elements throughout the several figures, the present invention will be described. The present invention incorporates a trained text classifier, also known as a topic spotter. In the subject text classification system, processing is performed in three phases: model preparation, training and topic spotting. During the model preparation phase, classification categories, document features (vocabulary) and evidence edits (the relationships between document features and classification categories) are specified. During the training phase, document feature statistics are gathered and relationships between features and classification categories are quantified. Next, in the topic spotting phase, these relationships are used to classify documents. Note that we use the terms classification category and concept or concept node interchangeably as text classification categories tend to denote concepts, which may be represented as nodes in a concept graph or tree. This is not intended to limit the application of the present invention to such categories. In FIG. 1, there is shown a block diagram of the general layout of the present invention. More specifically, the present invention includes: a feature finder 10, a term list 20, a feature list 30, a feature identifier (which may include an entity spotter) 40, recorded evidence edits (REE) table 50, tags 60, a symbol table 70, a feature table 80, a topic spotter matrix 90, and one or more feature vectors 100. Feature finder 10 has two tasks: (1) convert a document into a vector of feature IDs, wherein each feature in the document is represented once, with a count of the number of times it occurred in the document; and (2) introduce BE-tags into the eXtended Markup Language (XML) form of the document. BE-tags are XML tags denoting entity types, including such things as organizations, place names, people's names, and domain terms, inserted around the text that has been recognized by the feature finder. Term list 20 is a user-inputted list of words and phrases denoting entities of various types (organization names, technical terms, etc.) These are document features that may be useful in categorizing the documents. They are eventually entered into symbol table 70 and, feature table 80. In one embodiment, term list 20 includes vocabulary, synonyms, etc., specified by knowledge engineers. Feature list 30 is a list of features automatically extracted from the training set without human intervention. Feature identifier 40 is a software application run over a set of training documents to automatically produce feature list 30. All terms found by feature identifier 40 are added to symbol table 70 and feature table 80. The REE table 50 consists of user-inputted, concept evidence vector edits. Concept evidence vector edits are user modified feature vectors 100 with associated flags and weights. The information in REE table 50 is used to modify feature vectors 100 in topic spotter matrix 90. In one embodiment, REE table 50 may not be automatically modified (i.e., it may only be overwritten by manual user input). Tags 60 are a user-inputted list of category labels (also known in the literature as class labels) for the documents that make up the training dataset. The term "tag" is also used in this disclosure to denote a beginning and end markers (e.g. <TAGNAME> text </TAGNAME>) that mark units of text in a markup language such as HTML, SGML, and XML. Symbol table 70 maps terms or tokens to numeric IDs.

Feature table 80 is a table of multiple-symbol features useful for topic-spotting. The single-symbol features are found in symbol table 70. Finally, topic spotter matrix 90 is a matrix comprised of feature IDs 510 (rows) and concept nodes (columns). The matrix values are attributes of the relationship between features and concepts, including feature frequency data determined by calculating the number of times the feature occurred in documents tagged to that concept node (count), and assigning a value representative of the strength of association between the feature and the concept (weight). At the conclusion of the training phase, topic spotter matrix 90 is comprised of a combination of automatically generated data and manually inputted concept evidence vectors from REE Table 50.

Now that the basic layout of the present invention has been described, the next portion of this document will focus on a more detailed explanation of the operation of the present invention. As previously stated, there are—three phases of operation during execution of the text classification engine of the present invention (i.e., model preparation, training and topic spotting.) In the model preparation phase, classification categories, document features (vocabulary) and evidence edits are identified and inputted by the user into term list 20 and REE table 50, respectively. There is no limitation on how the user may complete this phase of the process. In one embodiment, the model preparation phase is an iterative process in which manual user inputs are integrated with automatically generated inputs to support model preparation. More specifically, the present invention can report back to the user on associations it has "learned" (derived via statistical means during training). The user would review the learned associations, select certain associations, change them from "learned" to "human", and then rebuild the classifier. The ultimate goal is to combine user inputs with automatically generated associations to improve the quality of the classifier. In another embodiment of the present invention, the following methodologies can also be used to improve the quality of the classifier:

a) Bootstrapping From Human Evidence
  1. a person specifies a few terms per category ("seed" evidence) in the REE;
  2. an untrained classifier is built using the REE;
  3. the classifier is used to classify a set of documents.
  4. these classified documents are used as a training set, producing a new trained classifier. This classifier itself is not subsequently used, but during the training phase, the classifier learns associations between terms in the documents and categories.
  5. the learned associations are presented to a person, who selects those that are useful and adds them to the REE;
  6. Steps 2–5 are repeated until the classifier is sufficiently high quality.

b) Bootstrapping From All Available Information
1. a person specifies a few terms per category ("seed" evidence) in the REE, or a person classifies a set of training documents, or both
2. a classifier is built using the REE and trained using the training documents;
3. the classifier is used to classify a set of documents.
4. the classified documents and the manually specified training documents are used as a training set, producing a new trained classifier. This classifier itself is not subsequently used, but during the training phase, the classifier learns associations between terms in the documents and categories.
7. the learned associations are presented to a person, who selects those that are useful and adds them to the REE; and/or the classified documents are presented to a person, who selects those that are properly classified, which now become training documents;

Steps 2–5 are repeated until the classifier is sufficiently high quality.

Figure 2:
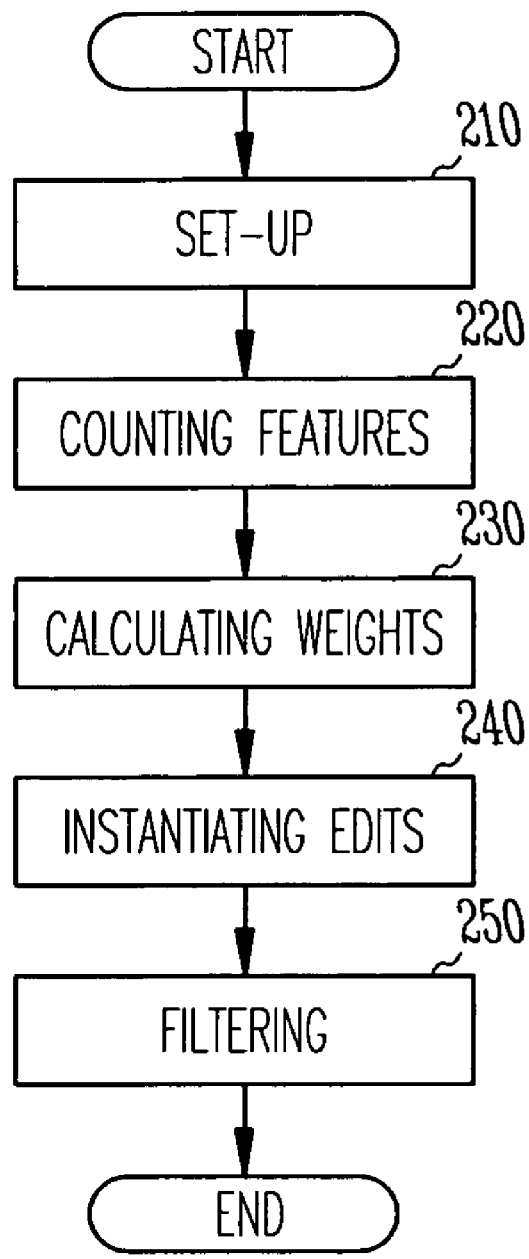
FIG. 2 is a flow diagram depicting the training phase of the present invention.
Figure 3:
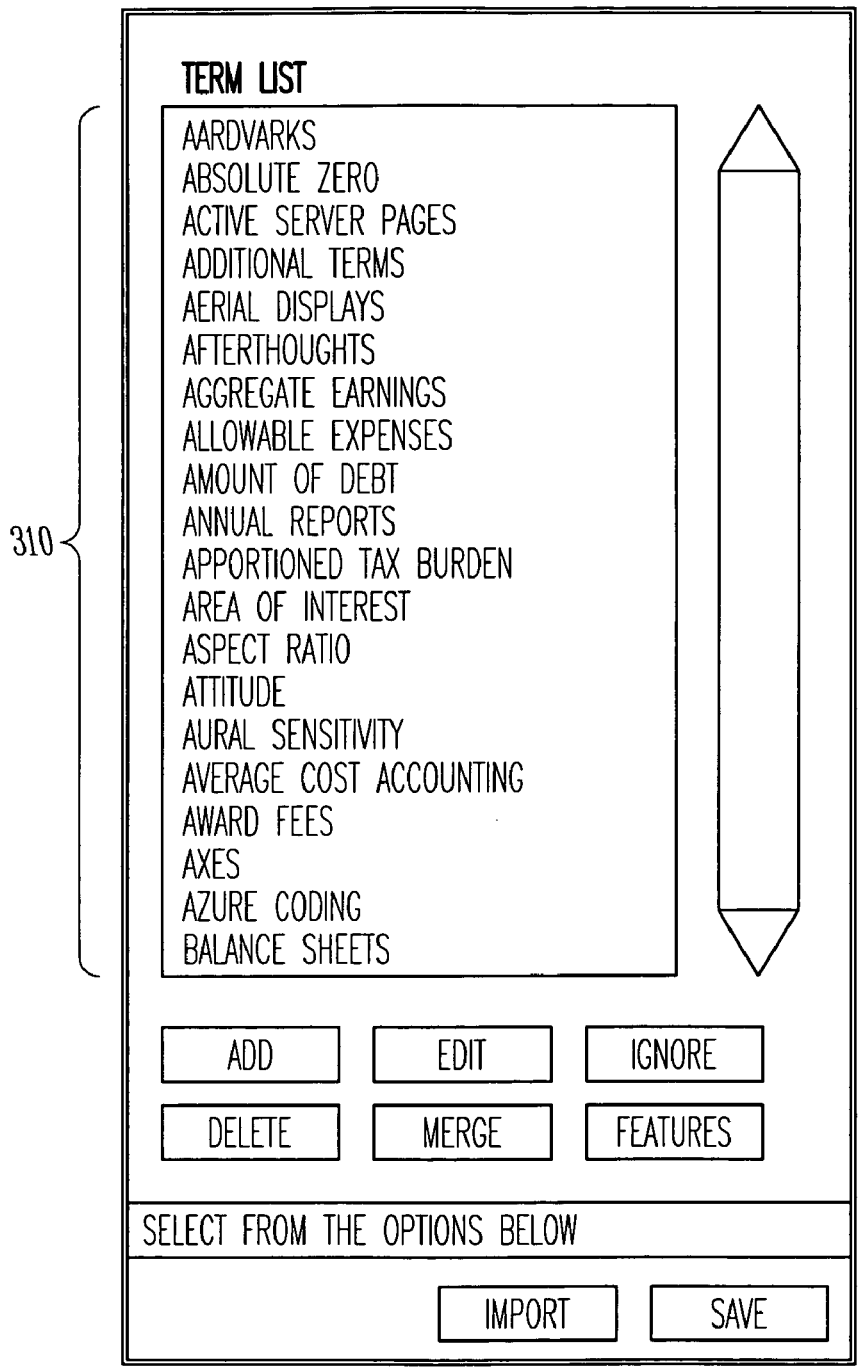
FIG. 3 is an example of a term list in accordance with one embodiment of the present invention.

Once the model preparation phase is complete, the training phase begins. Referring now to FIG. 2, it is shown that the training phase is comprised of four steps: set-up 210, counting features 220, calculating weights 230, and filtering 240. In set-up 210, a user may load term list 20 into the system. Since the present system includes the capability to operate with or without user-inputted term list data, this step is optional. An example of a term list 20 is shown in FIG. 3. As shown, term list 20 is comprised of a list of terms 310 (user-inputted words and phrases) with associated attributes 320. Terms 310 are the building blocks of features which are used by the system to classify documents. Since each term 310 in term list is manually inputted, they are referred to as human terms and cannot be automatically modified by the system. When determining whether a term matches text in a document, case differences (capitalization), certain morphological differences (plural/singular and verb inflection), and positional differences (if one term in the text overlaps another) may be ignored and a match is determined if the characters in the term match the document terms. Attributes 320, change that default behavior by allowing the user to define more specific characteristics that must be satisfied before a match will be determined. More specifically, the synset attribute (FIG. 3) relates synonymous terms; the exactMatch attribute controls whether the term is treated as case-sensitive and morphologically unchanging (if exactMatch is set to true, only text in a document with the same case and morphology as the term in the term list 20 will match); and the embeddedTermsAllowed attribute controls which terms are recognized (one or both) when two terms overlap.

A term is added to symbol table 70 whenever terms are loaded into the system from term list 20, feature list 30, and REE table 50. Before a term is added to symbol table 70, the text is tokenized, normalized and looked up. A token is a sequence of characters that makes up a single unit for processing. Tokens are separated by white space and/or punctuation symbols. In most cases, punctuation symbols are distinct tokens—for example, "Yahoo! " would be two tokens "Yahoo", and "!", but "Dr." is a single token, because the period is recognized as belonging to the abbreviation. Periods not followed by white space do not end a token ("askjeeves.com" is a single token). The tokenization step takes a filename or memory buffer and outputs a token buffer. In one embodiment, the tokenizer also has the capability to tokenize text embedded in XML tags. A tag may comprise a single token (e.g., "<Tag Name=Fred Value=F>" would be a single token), or a tag may be treated like any other text (the tokens for the previous example would be "<", "Tag", "Name ", "=", "Fred", "Value", "=", "F", and ">"). The normalization step takes a token or tag and returns the normal form of the token/tag. The first step in normalizing a token is to convert the token to lower case. The second step is to pass the lower case token to a stemmer. A stemmer, as known by those skilled in the art receives a word as input and returns the stem or lemma of the word. For example, the stem of "carrying" is "carry," and the stem of "dogs" is "dog". If the stemmer finds a stem, it is returned, otherwise, the lower case token is returned unchanged. In the event the token is a tag of the form "<Tagname Attr1=Val1 Attr2=Val2 . . . >" where the attribute value pairs are optional, the normalized form is "<tagname>". The first step in normalizing a tag is to identify the tag name. In XML, a tag is defined as the text following "<" or "</" up to the first white space. The next step is to convert the tag name to lower case. The final step is to construct the normalized tag. This three step process is further explained in FIG. 4. Assume a term in term list 20, symbol table 70, REE 50 or in document 410 is comprised of the text "Radios, Inc." Once this text is processed by the tokenizer, a token buffer 420 containing three tokens: "Radios", ",", and "Inc." is generated. The tokens are then normalized into another buffer 430. Specifically, "Radios" is converted to "radios" and passed to the stemmer. The stemmer looks up "radios" and returns "radio". A "," returns unconverted, and "Inc." is returned as "inc."

Figure 4:
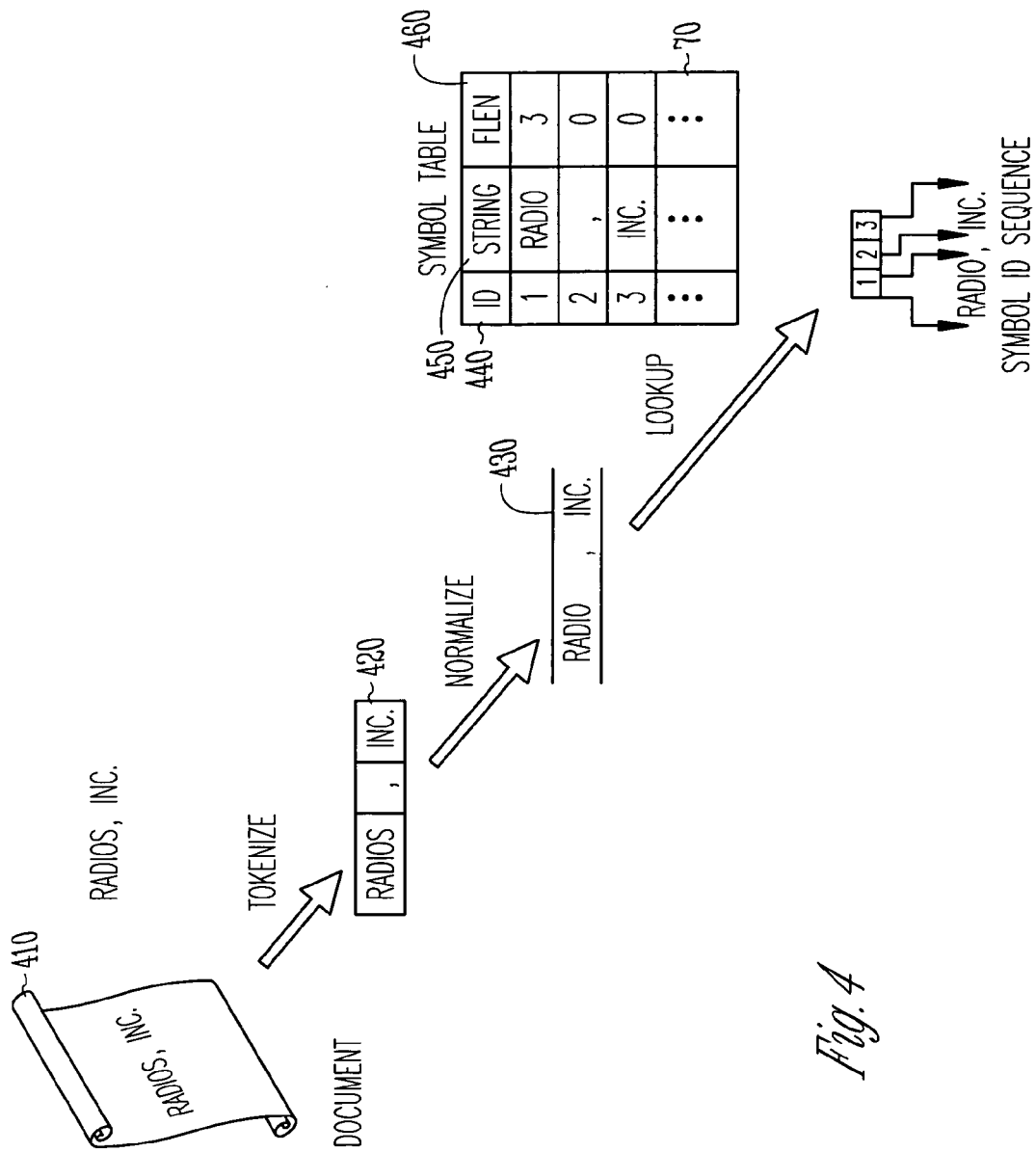
FIG. 4 is an example of a symbol table in accordance with one embodiment of the present invention.

When a term is added to symbol table 70, a symbol table lookup is first performed on the normalized tokens. Referring now to FIG. 4, it is shown that symbol table 70 contains a symbol ID field 440, a symbol string field 450 (the normalized token), and the length of the longest feature that begins with the symbol (FLen) field 460. Symbol table 70 is a mapping from strings to IDs and is initialized from data inputted during training (training documents and the term list). Text may also be automatically loaded into symbol table 70 at system startup. For example, single stop words (e.g., the, in, of, at, to, etc.), punctuation, and XML tags may be loaded into symbol table 70 with a special term identifier. During topic-spotting, if a symbol is encountered that is not already in symbol table 70, an "unknown symbol" ID is returned. If a string is not found in symbol table 70 during training, a unique symbol ID and an integer are returned. The integer represents the length of the longest multi-word feature that begins with this symbol. In the case where a token is a tag, attributes are ignored. In other words, "<Symptom>" and "<Symptom OS=NT>" are both recognized as instances of the "<Symptom>" tag. In effect, instances of a tag with different attributes will get the same symbol ID. In the present example, "radio" is looked up in the symbol table, and its ID (1) and FLen (3) are returned. An entry is appended to the Symbol ID Sequence, containing ID (1), FLen (3), a pointer to the beginning of "Radios" in the token buffer, and length (6). The next token is looked up in symbol table 70, and its ID (2) and FLen (0) are returned. An entry is appended to the Symbol ID Sequence, containing ID (2), FLen (0), a pointer to the beginning of ",", in the token buffer, and length (1). The final token is then looked up in symbol table 70. Its ID (3) and FLen (0) are returned. An entry is appended to the Symbol ID Sequence, containing ID (3), FLen (0), a pointer to the beginning of "Inc." in the token buffer, and length (1.

Figure 5:
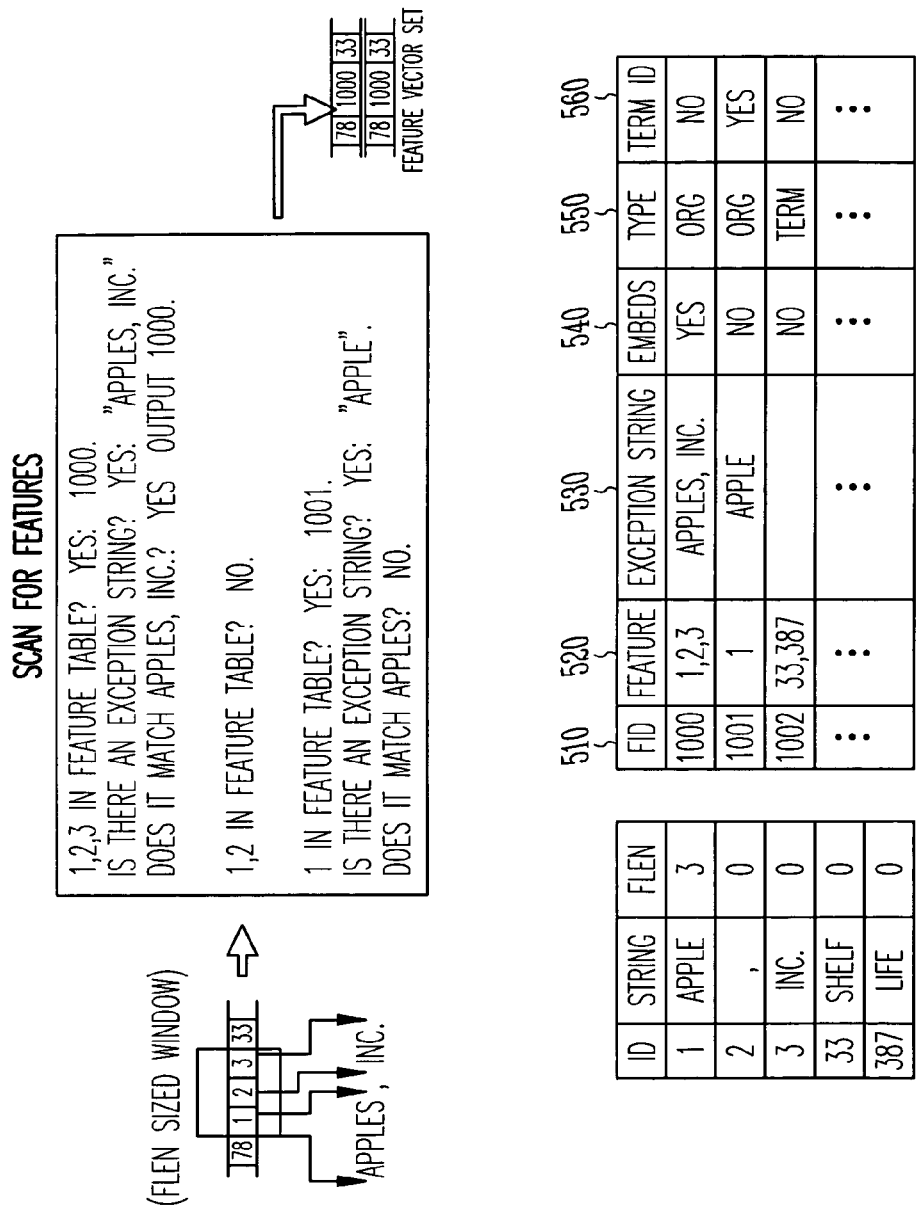
FIG. 5 is an example of a symbol table and a feature table in accordance with the present invention.

Once the Symbol ID Sequence for a term is known, an entry for the term is entered into feature table 80. A term in feature table 80 is referred to as a feature. Feature table 80 is initialized from data generated in the set-up phase (term list 20, REE Table 50, and feature list 30). As shown in FIG. 5, feature table 80 contains the following fields: Feature ID (FID) 510, Feature 520, Exception String 530, Embeds 540, Term type 550 and TermID 560. Feature ID 510 is a unique ID for identifying each feature and synonym set. Feature 520 is the Symbol ID Sequence 440 representing the "normalized" form of the feature. FIG. 5 shows that Feature 520 may include one or more symbol IDs, corresponding to each Symbol ID Sequence 440 represented in the feature. Exception string 530 is NULL if the feature does not qualify as an exactMatch. If the feature is an exactMatch, a tokenized version of the string is stored in exception string 530. In one embodiment, exactMatch features are only recognized if they match both the capitalization and the morphology of their non-normalized form. In another embodiment, capitalization and morphology may vary independently. In other words, a feature (specified in term list 20 and loaded into feature table 80) may be configured such that it is recognized in a document if the capitalization matches, regardless of morphology. Conversely, a feature may be configured such that it is recognized in a document if the morphology matches, regardless of capitalization. To support these capabilities, the present invention stores the non-normalized form and the normalized form of the feature in feature table 80. An exactMatch feature "Apple" will only match the exact string "Apple" in a document. If "Apple" and "apples" were both exactMatch features and "apple" were a non-exactMatch feature, there would be three entries in feature table 80, with distinct FIDs 510 for each. The embedded allowed (Embeds) 540 field indicates whether other terms can overlap with this term and whether shorter terms can be embedded within this term. For example, "Microsoft office" would be marked as "Yes" if the intent was to allow the shorter term "Microsoft" to also be identified within it. Term type 550 specifies whether the feature is an ORG, LOC, PERSON, TERM, or XML_REGION_TAG, and TermID 560 indicates whether the feature originated from term list 20 or feature list 30. If the feature originated from the human-entered term list 20, the termID from that list or the word "Yes" is stored here. If the feature was discovered by feature identifier 40 during training and entered into feature list 30, the value is set to −1 or "No". If a feature list 30 entry is textually the same as a term list 20 entry, only the term list 20 entry is added to feature table 80. In other words, if there is a clash between an automatically identified term and a user-inputted term, the user-inputted term wins.

After the human terms are loaded into term list 20, symbol table 70 and feature table 80, the user next loads the REE table 50. As previously stated, REE table 50 comprises words and phrases with associated flags and weights (explained below). The words and phrases are treated as human terms and entered into symbol table 70 and feature table 80, and the relationships are entered into topic spotter matrix 90.

Figure 6:
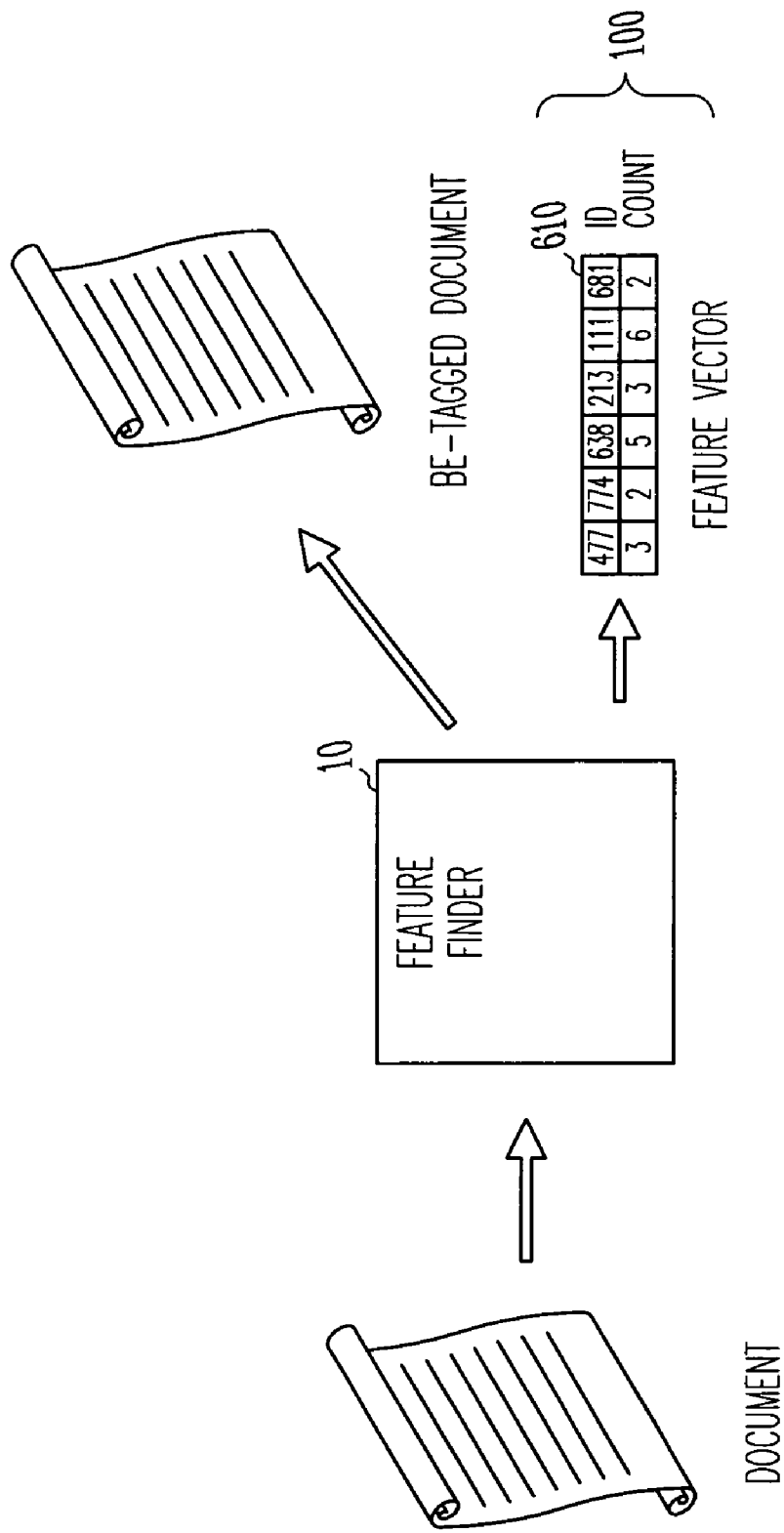
FIG. 6 is an example of a Recorded Evidence Edits Table in accordance with one embodiment of the present invention.

FIG. 6 shows part of an REE table 50, comprising category 610 which has evidential terms 620 which in turn have evidential term attributes 630. REE table 50 has been loaded when all evidential terms have been loaded. Loading an evidential term takes place in two steps. The first step is loading the term into the symbol and feature tables using the process described in FIG. 4. An evidential term may already be present in the symbol and feature tables, in which case the first stage comprises finding its TermID 560. The second step is updating the topic spotter matrix 90. Topic spotter matrix 90 is updated in the second stage of loading an evidential term by creating a row for the feature, indexed by the TermID, if no such row exists; creating a column for concept 610, if no such column exists, and creating a matrix element for the feature/column pair if no such element exists. Attributes of each element are set according to the evidential term attributes 630. If no attributes are specified in evidential term 620 then default settings are used. It may be appreciated that there are many ways to represent a matrix and any one of them may be used; this description does not limit the invention to a particular matrix representation. In particular it should be appreciated that the matrix may be sparse, and any sparse matrix representation can be applied. Once topic spotter matrix 90 is updated, feature table 80 is updated with entries from feature list 30.

When a feature is associated with a concept node, it is called evidence. The association between a human term and a concept node which has been manually specified by a user is human evidence; these are recorded in REE table 50 during the model preparation phase. A term associated with a concept node which has been assigned by the system is learned evidence. The attributes of evidence are:

Count—frequency data that records how often any member of the feature/synonym set occurred at each concept node. The default value for the count attribute is a parameter whose value affects the calculation of the weight attribute, if the latter is not specified in the REE table 50;

Weight—the strength of the association between a term (human and learned) and a concept node (manually or automatically specified). In the case of human evidence, the weight can be assigned by the system or it can be assigned by a person. The weight for learned evidence, on the other hand, can only be assigned by the system. A user may assign the weights such that a feature contributes to the decision to assign a document to a particular concept node. The user may also determine the degree to which a feature contributes to the decision. That is, a user may specify that the feature contributes greatly to the decision to assign a document to a concept node, and slightly to the decision to assign the document to another concept node. REE table 50 provides the user with the ability to manually control which words and phrases are features, which features matter for each concept node, and how much they matter. In the event a user does not specify the weight, it will be assigned based on the feature's distribution in the training data (possibly modulated by its prior probability of occurrence in the language). In the absence of training data, the weight will be assigned based on the feature's distribution in the REE (again, possibly modulated by its prior probability of occurrence in the language). In this way, the user may specify which features matter, and allow the degree that they matter be determined by their actual usage.

Edited—a Boolean attribute that is set if the matrix element has been specified in the REE. Causes element to be "sticky" across training;

WeightEdited—a Boolean attribute that is set if the weight has been user-inputted. Causes weight to be "sticky" across training. If set, the weight is not modified by training calculations. Conversely, if WeightEdited is not set, the weight is modified by training calculations;

RejectConcept—a Boolean attribute that if set, a document or query containing the feature will not be tagged to (classified to) the concept, regardless of what else is in the document or query;

DirectHit—a Boolean attribute that if set, a document or query containing the feature will be tagged to the concept, regardless of what else is in the document or query;

Overlap—a Boolean attribute (allowed/disallowed) that controls whether text matching a feature that overlaps this feature in a document or query is matched. A first term overlaps a second term if the first term is found anywhere inside the second term. For example, "printer" overlaps "printer driver software." Also, "printer driver" overlaps "driver software" in the text "printer driver software";

Stemming—a Boolean attribute that if set, a document or query may contain a stem of this term;

Case—a Boolean attribute that if set, the feature is case-sensitive. A document or query must comply with the case of the feature;

Stop—if set, the feature is a stop word—it is not counted during topic spotting. This bit is ignored during training;

Scope of Feature—an attribute that determines the scope of a feature (e.g., use for queries only, use for documents only, use for both)

FilteredOut—if set, the feature is not counted during topic spotting. This differs from the Stop bit because it is set automatically in the filtering step of training.

All of these attributes, except Count and FilteredOut, may be specified in the form of evidential term attributes 630. Two of the attributes are specified implicitly: Edited (specified implicitly by the evidential term in REE table 50) and WeightEdited (specified implicitly by the weight attribute of the evidential term in REE table 50).

After REE table 50 is loaded, feature identifier 40 is executed and feature list 30 generated. Since feature identifier 40 uses a computer process to identify terms to be placed in feature list 30, it is said to generate learned terms.

At this point, Set-Up 210 is complete. Processing next flows to step 220 and Counting Features commences. It is important to note that step 220 is optional. In other words, if no training data is available or desired, this step may be skipped. When counting features 220 executes, tags 60 are read into the system, identifying the concepts associated with each document in the training set. Training documents are then processed by feature finder 10 (FIG. 1), which creates a feature vector 100. Referring to FIG. 7, it is shown that feature finder 10 performs two tasks: convert a document into a feature vector 100, wherein each feature in the document is represented with a count of the number of times it occurred in the document; and to introduce BE-tags into the XML form of the document stored in the database. Once a feature has been recognized, it is entered into feature vector 100. As shown in FIG. 7, feature vector 100 represents the relevant topic-spotting features within a segment of text. Feature vector 100 consists of a plurality of feature elements 710. Each feature element 710 contains a termID (which may be a Symbol ID Sequence 440 for single-word features, or a feature ID 510 for multiple-word features), and a frequency count. To find features within text represented as a Symbol ID Sequence 440, a variably-sized sliding window is moved across the sequence. The subsequence of symbol IDs visible in the window is looked up in feature table 80, where feature sequences are stored. The first time a feature is encountered, it is entered into feature vector 100, with a count of 1. Each subsequent time the feature is encountered, its count in feature vector 100 is incremented. While it is not shown in FIG.7, feature elements 710 of feature vector 100 include attributes (case, morphology, etc.) corresponding to the attributes stored in feature table 80. If a feature is matched that overlaps another feature, a feature element 710 for the feature is added to the feature vector 100 and the Overlap attribute of that feature element 710 is set. If the feature is not case sensitive (i.e., exception string 530 is NULL), and the subsequence of symbol IDs equals the text visible in the window, a feature element 710 for the feature is added to the feature vector 100. If the feature is case sensitive, the present invention compares the non-normalized form stored in feature table 80 with the string spanned by the symbol ID subsequence in the text. This comparison is case sensitive when scanning documents and case insensitive when scanning queries. In essence, a user inputting a query at a terminal is given the benefit of the doubt whether they intended to capitalize a word in the query, but failed to do so. If this comparison succeeds, again, the feature is found, and a feature element 710 for the feature (identified by feature ID 510) is added to the feature vector 100 and the Case attribute of that feature element 710 is set. The same two-comparison mechanism is used to check for morphological matches when a feature's Stemming attribute is set. When such a match is found, the Stemming attribute of its feature element 710 is set. Stop words, punctuation signs, XML tags, etc. are not passed to feature vector 100. Finally, matches to single-word, case sensitive features are a special case. In this case there is not enough information to tell whether the text is trying to actually convey the feature, or the non-normalized form. For example, a text segment containing the word "Apple" may refer to the company Apple or the text may be "Apple farmers . . . " Therefore, for matches to single-word, exactMatch features, both the FID 510 and the symbol ID 440 are inserted into the feature vectors 100. This does not result in an over count of words that occur at the beginning of a sentence, because the present invention only outputs two IDs for a word when it determines that text in its non-normalized form has a different meaning from the identical word in its normalized form. As the input text is copied to the database, XML tags are inserted around the text recognized by the feature finder.

Once feature vector 100 processing is completed for a document, the topic spotter matrix 90 is updated with the information in feature vector 100. This process of producing a feature vector 100 and updating topic spotter matrix 90 with the feature vector data is repeated for each document in the training document set. Updating the topic spotter matrix 90 from a feature vector 100 may be done as follows: for each feature in feature vector 100, if no row exists for that feature, a row is created, indexed by the TermID 560 for the feature; for each concept associated with the document, if no column exists for that concept, a column is created. If no matrix element for the feature/column pair exists, an element is created with an initial Count attribute set to zero. Then the Count attribute of the element is incremented by the count for this feature in feature vector 100.

If a user adds a feature to the synonym set, the frequency data for this feature in topic spotter matrix 90 must be updated, and the weights recomputed. Correspondingly, if a user removes a feature from a synonym set, the frequency data for the removed feature must be determined and removed (given its changed membership), in order to recompute the weights. One method for obtaining this information is to remove the feature, reprocess all documents, and perform a full retraining to recompute the weights as a result of this edit operation. To avoid this full retraining, one embodiment of the present invention maintains frequency data for each member of a synonym set in the topic spotter matrix 90, in addition to the aggregate data stored in the synonym set/feature row. If a feature is removed from a synonym set, the present system can subtract its frequency data from the synonym set/feature data and recomputed the weights of the remaining synonym sets without any additional document processing.

After all documents have been classified into feature vectors 100 and the topic spotter matrix 90 has been updated with all the feature vectors 100, processing flows to step 230 (calculating weights). The weights are calculated from the counts produced in the previous step. In one embodiment, the formula for calculating the weight is TF-ICF, which is term frequency (the number of times the term occurs at a category) times inverse category frequency (the inverse of the number of categories associated with the term). TF-ICF is based on the premise that a term T is a better predictor of a category C the more frequently T occurs at C and the less frequently T occurs at categories other than C. An extreme example is a feature appearing many times in only one category, that term occurring in a new document should strongly predict that category. But note that a term appearing only once and only in one category could be just a misspelled word. At the other extreme is a term that appears the same number of times in all categories. This term in a new document gives us no useful information. TF-ICF is derived from a standard formula known as TF-IDF, where D refers to documents. Many formulas for calculating weights are known in the art, including mathematically sophisticated versions of TF-IDF or TF-ICF which may take into account the number and size or proportion of the training set tagged to each category, normalize the resulting weights so as to make them more easily comparable, etc. In any event, a weight calculating formula is applied to each element in topic spotter matrix 90 resulting in a weight that is based on the distribution of terms in the training data. One embodiment of the present invention can assign weights based upon the distribution of terms in the training data, and upon the human specifications in the REE table 50. Specifically, the present invention may utilize any combination of training data and/or REE edits to assign weights (e.g., when no training is used, when no REE edits are used, and when a combination of REE edits and training data are used). In the first case, the weights explicitly specified in REE table 50 are used unchanged. Weights can be assigned based on the distribution of features in the REE table 50 (which corresponds to the distribution of features in the topic spotter matrix) when no weight is specified. For example, some form of TC-ICF may be applied where the term frequency in the absence of training data is taken to be one for every matrix element constructed when REE table 50 was loaded. In this case, a classifier with only manually chosen features results, but it has operating characteristics of a statistical classifier because of the way the weights are assigned. It is related to rule-based classifiers in that humans specify all of the features used in classification, but differs from rule-based classifiers in that these features do not take the form of rules. In the second case, weights are based solely on the distribution of terms in the training data. The third case relies on data in REE table 50 and training data. For a given element in topic spotter matrix 90, if it is in REE table 50 and a value for the weight attribute is specified, the value of that attribute is used as the weight. Otherwise, it is computed based on a combination of its distribution in the training data and in REE table 50. This follows from the fact that feature occurrences in both REE table 50 and in the training data contribute to the Count attribute of a topic spotter matrix element, and that attribute represents the frequency used in the TF-ICS computation.

The relative effect of features present in REE table 50 versus features present in training data may be controlled in several ways. First, the effect of REE table 50 may be increased by increasing the default value for the Count attribute used when loading REE table 50. Second, a scaling parameter S between 0 and 1 may be applied as a multiplier of the weights associated with learned features. Setting S=0 will force the system to consider only the human evidential terms. Increasing this parameter increases the contribution of the learned terms, until the limit S=1 at which the learned terms are considered equal to the human evidential terms. Third, weights for human evidence may be set by the system (statistical weights for human evidential terms) or by a person (human weights for human evidential terms). For a human evidential term which has a human weight, the system still calculates a learned weight even though this weight is not used in the standard classification operation. Consider two sets of evidence with weights: a) All human evidential terms, with human weight and learned weight; b) human evidential terms and learned evidence terms, with learned weights. A mixing parameter lambda, between 0 and 1, with a multiplier of (1−lambda) is used for weights from model A, and a multiplier of lambda used for model B. The mixture model, (1−lambda)*A+lambda*B, is variable between fully human specified performance (at lambda=0), and fully learned performance (at lambda=1).

After the calculating weights step 230 is completed, processing flows to step 240, where filtering occurs. The filtering step allows a user to identify those features that are useful for categorization and to discard those features that are not useful. More specifically, the filtering step allows the user to filter out or discard matrix elements since a feature may be useful evidence for categorizing into one category but not another. The process of filtering an element out means setting a bit to denote that the element is disabled. When documents are classified, the disabled element will not contribute to the classification. One embodiment of the present invention includes two separate filters: (1) MinWeight—a lower threshold for the weight of a feature. Features with lower weights get filtered out; and (2) FeaturesPerConcept—an integer designating the number of features kept for each category. More filters may be applied, and other filters are known in the art. Completion of the filtering process completes the training phase of the subject invention. The topic spotter matrix 90 gives the user a concise representation of the relationships between features and concept nodes in the training documents.

This disclosure describes the training phase as comprised of four steps. However, it is important to note that all four steps are not necessary during a particular training session. At the completion of the training phase, the system may consist of classification data based solely on user inputs, based solely on automatically classified data (skipping the user-input steps) or based on a combination of user inputs and automatically classified data. The training phase is also recursive in that it may be executed, reviewed by a user, and then re-executed at least one other time to refine the previously reviewed results.

Figure 8:
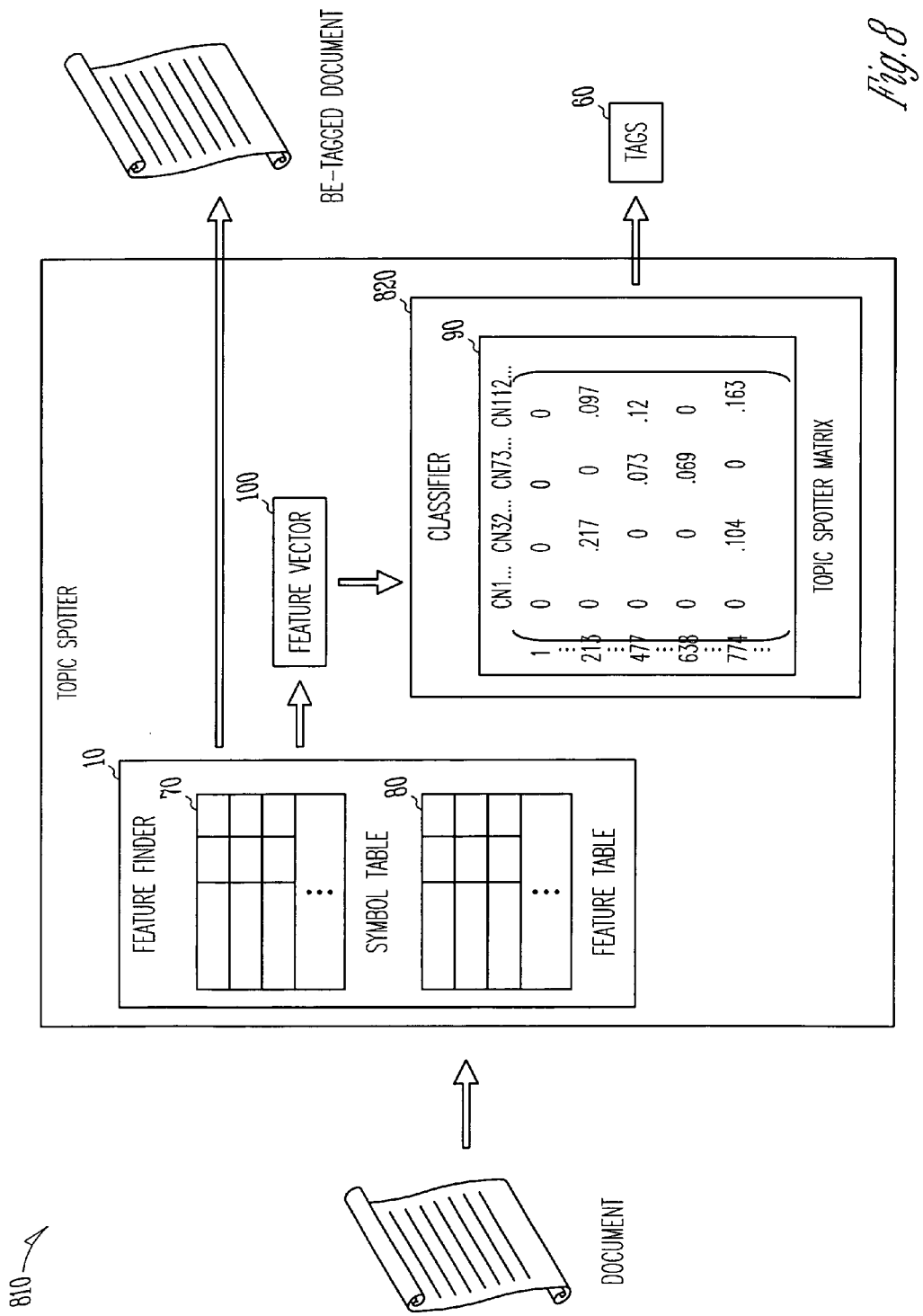
FIG. 8 is a block diagram depicting the operation of the text classifier in accordance with the present invention.

Once the training phase is completed, the topic spotter may be executed to classify text. While this description mainly refers to the process of classifying documents, it is important to keep in mind that any machine-readable text may be classified, including text input by a user with no persistent storage (such as from a text box in a user interface). FIG. 8 shows the inputs, processing and outputs of the topic spotter. As shown in FIG. 8, topic spotter 810 is comprised of feature finder 10, feature vector 100, and a classifier 820. Classifier 820 is further comprised of a topic spotter matrix 90. In operation, feature finder 10 uses symbol table 70 and feature table 80 created during the training phase and produces a feature vector 100 from the input document, and a BE-tagged version of the document. BE-tagging and feature vector production are performed as follows: the text of the document is copied as it is scanned for features. Each time a feature is recognized, it is placed into feature vector 100 together with its attributes. An initial BE-tag, the text of the feature, and the terminating BE-tag are inserted into the document copy. Feature vector 100 is used to classify the document. If a user query is being classified, the resulting feature vector has an attribute (Scope) set to Query; if it is a document being classified, the Scope attribute is set to Document.

The classification process is akin to a matrix multiplication in that each document's feature vector 100 is applied to the matrix. For each feature in the vector 100, for each column of the matrix, the weight in the matrix element for the row indexed by the TermID of the feature is multiplied by the count of the feature in the vector 100 and the result is added to a running sum associated with the concept represented by that column. Once all features in vector 100 have been processed in this manner, the value in each running sum is the score of its concept. If a score is below a threshold (which is a parameter), that concept is eliminated. The remaining concepts are sorted by score into a list, and the top N concepts on the list are selected. These N concepts are the categories into which the document is classified, and the score provides a confidence measure of the classification.

FIG. 9 shows a mathematical representation of topic spotting as a matrix multiplication—the matrix is multiplied by the vector of features, and the result is a vector of concepts. The equation in FIG. 9 is comprised of three elements: concept $C_j$ (concept), $W_{ij}$ (weight), and $f_j$ (feature). Feature vector F represents a document/query. It is multiplied by a matrix W to provide a concept vector C. Matrix W is a feature-concept matrix. Each matrix element $W_{ij}$ represents the strength of association between feature $f_j$ and concept $C_j$. If $W_{ij}$ is non-zero, then $f_j$ is evidence for $C_j$. Values for matrix element weights $W_{ij}$ are real numbers between −1.0 and 1.0. Such matrix processing is well known in the art and techniques for efficient multiplication using a sparse matrix representation are known. A user can set the weights via REE table 50, which in one embodiment, is the only way to introduce negative weights. A weight of zero means $f_j$ in a document (or query) D does not influence whether D gets tagged to $C_j$. A positive weight means D is more likely to get tagged to $C_j$, and a negative weight means D is less likely to get tagged to $C_j$. The classification step as described above is augmented with several novel aspects that use the matrix element attributes (evidence attributes) to affect the classification procedure. A matrix element contributes to a concept's score if that matrix element's weight times its feature's count is added to the running sum for that concept. In order to affect classification, the running sum has several attributes in addition to the sum itself, and as the running sum becomes the score for the concept, the score carries these attributes. Feature vectors 100 and feature vector elements 710 also have attributes determined during the operation of feature finder 10. If any of the matrix elements that contribute to a concept's score have the RejectConcept attribute set, the RejectConcept attribute of the running sum is set. Prior to selection of the top N concepts, any concept whose score carries the RejectConcept attribute is eliminated. If any of the matrix elements that contribute to a concept's score have the DirectHit attribute set, the DirectHit attribute of the running sum is set. Prior to selection of the top N concepts, any concept whose score carries the DirectHit attribute is moved to the front of the list. If there are more than N concepts carrying the DirectHit attribute, all of them are selected. If any of the matrix elements that would contribute to a concept's score have the Stop or FilteredOut attribute set, such a matrix element does not contribute to the concept's score. (In other words, the presence of the stop or filtered out attribute causes the matrix element's weight times its feature's count not to be added to the running sum). If any of the matrix elements that would contribute to a concept's score have the Case attribute set and its feature does not have the Case attribute set in the feature vector 100, such a matrix element does not contribute to the concept's score. If any of the matrix elements that would contribute to a concept's score have the Stemming attribute set and its feature does not have the Stemming attribute set in the feature vector 100, such a matrix element does not contribute to the concept's score. If any of the matrix elements that would contribute to a concept's score have the Overlap attribute set to Disallowed and its feature has the Overlap attribute set in the feature vector 100, such a matrix element does not contribute to the concept's score. If any of the matrix elements that would contribute to a concept's score have the Scope attribute set to QueryOnly and its feature has the Scope attribute set in the feature vector 100 to Document, such a matrix element does not contribute to the concept's score. Correspondingly, if any of the matrix elements that would contribute to a concept's score have the Scope attribute set to DocumentOnly and its feature has the Scope attribute set in the feature vector 100 to Query, such a matrix element does not contribute to the concept's score.

There is a system parameter that controls whether statistically defined features (learned evidence) are to be used during classification. If the system parameter is set to HumanOnly, then any of the matrix elements that would contribute to a concept's score that do not have the Edited attribute set do not contribute to the concept's score.

Unlike prior art statistical text classifiers, the present invention allows users to not only to specify features, but to identify the categories to which those features are relevant. The result is that a specified feature may have an effect on classification largely or only to a specified concept (depending on the parameter that controls the contribution of human evidential terms versus the contribution of learned evidential terms). The importance of this in preventing false correlations can be easily seen. Suppose one concept is Litigation and another concept is Product Recalls. A person might well identify "lawsuit" as a feature with the Litigation concept in mind. In a standard statistical classifier, in which it is not possible to specify that "lawsuit" is relevant to Litigation, its distribution in the training data will completely determine its effect on classification. If the classifier is trained on news articles, a higher than average number of occurrences of "lawsuit" is likely to appear in articles about Product Recalls. The resulting classifier will contain a false correlation between "lawsuit" and Product Recalls. That is, it will tend to classify documents about litigation to the Product Recalls category even if they do not concern recalls. In the present invention, it is possible to specify that "lawsuit" is relevant to Litigation (via the REE) and it is possible to control the contribution of human evidential terms versus the contribution of learned evidential terms. In other words, the effect of the appearance of "lawsuit" in the training data for Product Recalls can be minimized or eliminated. The effect can be eliminated by setting the system parameter controlling the use of statistically learned features to HumanOnly. Note that this is not the same as ignoring the training data. The weights assigned to the human-specified features which are used reflect the distribution of those features in the training data. The effect can be minimized while still using statistically learned features by setting the system parameter to UseAllFeatures rather than to HumanOnly and by setting the default value for the Count attribute used when loading REE table 50 to a high value, setting the scaling factor S to a low value, or setting the mixing parameter lambda to a low value.

One embodiment of the present invention can group categories, or use distinct (exclusive) sets of related categories, it can classify against multiple sets of categories (perspectives) as a single operation, and classification against one perspective can affect classification against other perspectives. Each perspective relates to a distinct aspect of the text to be classified. Consider three perspectives on news stories: geography (where the story took place), business entities (what companies the story is about) and topic (what the story is about). The features that are relevant to geography (typically place names) and their desired effect on classification are largely different from the features relevant to business entities (typically company names) and their desired effect, which are largely different from the features relevant to topic (a much broader class of features) and their desired effect. Note that the same textual feature may well be relevant to multiple perspectives ("Apple" may refer to a business entity or a crop whose price just fell). The categories or concepts that make up a perspective "compete" against one another for documents but do not "compete" against other perspectives. That is, an article about the Japanese fishing industry that happens to mention a cannery in Canada may be more relevant to Japan than to Canada, but it is not more relevant to Japan than to fishing—those aren't competing concepts. Therefore parameters such as the threshold above which a score must be to classify a document to a concept, and the number of concepts selected from those scored by the topic spotter (the top N) are specified per perspective.

The ability to avoid or minimize the effect of false cross-correlations that stem from training data is crucial when building a classifer that classifies against multiple perspectives. Suppose a category in a Topic perspective is Litigation and a category in a Business Entity perspective is Microsoft. If the classifier were trained on news articles during the antitrust suit against Microsoft, "Microsoft" would very likely become a statistically-learned feature correlated with Litigation, because so many news articles that were about Litigation were about that antitrust suit, and mentioned Microsoft.

Recall that the weights in the topic spotter matrix elements are set based not only on the appearance of a feature in training data tagged to a category and in an REE table entry for a category, but also based on the distribution of that feature in other categories. It is desirable to limit that dependence to the distribution of that feature in other categories in the same perspective. The relative frequency of the term "Microsoft" in training data tagged to the Microsoft category should be very high compared with its frequency of occurrence at other categories in the Business Entity perspective (such as IBM, Proctor & Gamble, . . . ). Its relative frequency may not be as high if categories in other perspectives are included—such as Software Products. For this reason, the training formula, when calculating the weight for a matrix element in the column of a particular category, takes into account which perspective that category is in, and limits its computation of ICF to those categories in the same perspective. In one embodiment of the present invention, all filter parameters are per perspective.

In the classification phase, the relationships identified in the training phase are used to classify documents, and identify the most closely related categories. In operation, the topic spotter processes one document at a time. In other words, a first document is completely tagged by the topic spotter before a second document is inputted for processing. This continues until all of the documents have been processed. In this way, the present invention may be configured to tag documents in a hierarchical sequence. A tagging hierarchy of perspectives is input; it specifies an association between a category C in one perspective P1 and a second perspective P2 (which is thereby considered to be lower in the tagging hierarchy). A document is classified to categories in P2 only if it is classified to category C. Thereby the results of document classification for a second perspective lower in the tagging hierarchy depend on the results of document classification for a first perspective higher in the tagging hierarchy. Note that this can assign a document to quite a different set of categories than if no hierarchical tagging were done. In one embodiment, each document is first classified against a set of perspectives. Depending on the resulting set of tags, it is tagged against other perspectives in accordance with the tagging hierarchy. For example, assume the following: there are four perspectives, P1 with categories C1 and C2, P2 with categories C3 and C4, P3 with categories C5 and C6, and P4 with categories C7 and C8. Assume that a document D would tag to C1 in P1, to C3 in P2, to C6 in P3, and to C7 in P4. Assume the tagging hierarchy is as follows: P1 is at the top. C1 "controls" P2, that is, documents are tagged against P2 only if they were tagged to category C2. C2 "controls" P3. C3 controls perspective P4. In this embodiment, D would first be tagged against P1, resulting in a tag to C1. It would then be tagged against P2, according to the tagging hierarchy, and this would result in a tag to C3. It would then be tagged against P4, resulting in a tag to C7. It would never be tagged against P3, because it was not tagged to C2, which controls P3, so it does not receive tag C6 (C is not classified into category C6). In another embodiment, each document is classified against all perspectives in a single operation. Resulting tags that violate the tagging hierarchy are eliminated. Given the same example, in this embodiment, D initially receives tags C1, C3, C6, and C7. Tag C6 violates the tagging hierarchy because it is in P3, which is controlled by C2, but there is no tag to C2, so it is eliminated. Both embodiments produce the same set of final tags.

Another capability of the present invention is to classify based upon particular regions of the documents. Consider a document that first discusses a symptom, then the cause of the symptom, then the remedy. If this document were classified against a Symptoms perspective it would classify well if it were classified based on the text of the symptoms region of the document, and may classify poorly if it were classified based on the entire text of the document (for example, the symptom region of the document may talk about fainting and the cause section of the document may talk about low blood sugar. Low blood sugar may itself be a symptom—say, of diabetes). This capability is achieved by additional input parameters, additional functionality in feature finder 10 and additional functionality in updating topic spotter 90. An input parameter XMLRegions defines a set of XML tags. Text enclosed in those tags (such a region of text is called an XML region) are used in classifying a document; text not enclosed in those tags are ignored when classifying the document. If none of the XML tags is present in the document, a second input parameter UseWholeDoc controls whether the entire document is used for classification or the entire document is ignored (the document is not classified). When feature finder 10 is processing a document, it constructs one feature vector 100 for the whole document, and one feature vector 100 for each XML region. It does this as follows: a feature vector has an XMLTag attribute identifying an XML tag; if this attribute is null, the feature vector is for the entire document. When feature finder 10 encounters an XML beginning tag in the text, it looks the tag up in the XLMRegions parameter. If it finds it, it checks to see if a feature vector for that XML tag already exists, and if not, makes one setting its attribute to that tag. It also sets a flag in its memory to the effect that it is processing within that XML region. When it matches a feature, it creates a feature vector element in each feature vector for an XML tag for which the flag is set, along with a feature vector element for a feature vector for the entire document. When feature finder 10 encounters an XML end tag in the text, it looks the tag up in the XLMRegions parameter. If it finds it, it clears the flag to reflect the fact that it is no longer processing within that XML region. No feature vector elements will be added to the feature vector for that XML region until another beginning XML tag for that region is encountered. Topic spotter 90 is updated during training and computes scores for categories during classification with all feature vectors whose XMLTag is not null. If no such feature vectors exist for a document, then if the UseWholeDoc attribute is set, topic spotter 90 is updated during training and computes scores for categories during classification with the feature vector for the entire document. In this way, the present invention may be configured to train and topic spot within specific XML regions.

This is extended to allow the use of a different (possible overlapping) sets of XML regions for each perspective. Its easy to see that if a document were classified against a Symptoms perspective, a Causes perspective, and a Remedies Perspective, the document would classify well if it were classified against the Symptoms perspective based on the text of the symptoms region of the document, if it were classified against the Causes perspective based on the text of the causes region of the document, and if it were classified against the Remedies perspective based on the text of the remedies region of the document. The extension is straightforward: there is an XMLRegions parameter and a UseWholeDoc parameter for each perspective. Consider the following example.

Perspective A: no XML regions specified
Perspective B: use XML region SYMPTOMS; ignore document if region not present.
Perspective C: use XML regions CAUSES and REMEDIES; use whole document if region not present.
Perspective D: no XML regions specified Assume the system is now given a document with this text: "To fix <SYMPTOMS>dizzyness</SYMPTOM>, caused by <CAUSES>motion</CAUSES>, take <REMEDIES>aspirin.</REMEDIES>"

The present invention will produce three feature vectors for this perspective set for any document. For this document they are:

Vector1 (whole document):—associated with Perspective A and Perspective D
   To—1
   Fix—1
   Dizzyness—1
   Caused 1
   . . . etc.
Vector2 (SYMPTOMS region):—associated with Perspective B
   Dizzyness—1
Vector3 (CAUSES and FIX region)—associated with Perspective C
   Motion—1
   Aspirin—1

A topic spotter matrix element is updated during training and contributes to the scores for a category during classification for a feature vector with a given XMLTag only if that tag is in the XMLRegions parameter for the perspective containing the category whose column contains the matrix element. If no feature vectors with an XMLTag in the XMLRegions parameter for a perspective exist for a document, then a topic spotter matrix element is updated during training and computes scores for categories during classification with the feature vector for the entire document only if the UseWholeDoc attribute is set for the perspective containing the category whose column contains the matrix element. In addition to improving the quality of classification, classification against a perspective can affect which parts of the documents are looked at for classification purposes by another perspective at lower in the tagging hierarchy. Example: perspective A has nodes A1 and A2. A1 is an ancestor of perspective D1 in the tagging hierarchy. A2 is an ancestor of perspective D2 in the tagging hierarchy. D1 and D2 have the same classification models (i.e., the same evidence, the same topic spotter), except that D1 looks at XML regions A, B and C, while D2 looks at XML regions X, Y and Z. "Dependent tagging" in combination with XML regions also enables methods of classifying within a perspective. In other words, a single perspective can be broken into a set of smaller hierarchically tagged perspectives so that tagging decisions in a perspective lower in the hierarchy may depend on tagging decisions made in a perspective higher in the hierarchy. Using XML regions, the decisions in the smaller broken-out perspectives can be made based on different parts of the document. More specifically, perspective A has nodes A1, A2, etc. A1 is the ancestor/parent of perspective D which in turn is an ancestor/parent of perspective E. A uses regions 1, 2 and 3 (title, abstract and body of the text) to make its classification. D uses regions 22 and 23 (manufacturer's recommended corrective action and field service notes) to make its classification. Assignment to the final node E depends on distinctions in the regions A uses for the A level of classification, and then on the regions D uses for the D level classification.

The present invention may also be configured to automatically or manually tag documents based on perspective attributes. For example, the system provides a method for restricting the number of tags from a particular perspective that may be put on a document. The system further includes the capability to specify a threshold score above which a tag score must be for a tag to a node in a particular perspective to be put on a document. The system also includes the capability to modify the weight of a tagged category in a first perspective based on the existence of that same evidence in a second perspective. More specifically, the system may identify the top evidence (E) in a first perspective (based on the top evidence overall, the top evidence per node, the top percentage overall, the top percentage per node, or top evidence above a particular score, etc.). Then, for every other perspective in the knowledge map, if (E) is not the top evidence for that perspective, lower (E's) weight in that perspective. Lowering a weight can be by an absolute amount, a percentage, a relative amount, a reverse logarithm scale, any other uniform or non-uniform scale.

From the foregoing description, it will be appreciated that the present invention provides an efficient system and method for automatically classifying documents. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 1, 5 and 8. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and, therefore, no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. In a system comprising perspectives and categories, each perspective including at least one category representative of that perspective, a computerized method for classifying at least one item across multiple perspectives, said computerized method comprising:
    associating category features with each category, wherein each of said category features represents one of a plurality of tokens;
    producing a category vector for each category, wherein each category vector includes a weight corresponding to each category feature, said weight indicative of a degree of association between said category feature and said category;
    associating item features with each item, wherein each of said item features represents one of a plurality of tokens found in said item;
    producing a feature vector for each item, wherein each feature vector includes said item features with a count corresponding to each item feature, said count indicative of the number of times said item feature appears in said item;
    multiplying said category vector by said item vector to produce a plurality of category scores for each item; and
    for each perspective, across multiple perspectives, classifying an item into a category provided said category score exceeds a predetermined threshold.

2. The computerized method of claim 1, wherein
    the count includes at least one subcount indicative of the number of times the item feature appears in a particular region of the item, wherein the particular region of the item is a subset of the item taken as a whole; and
    for first and second categories, in classifying the item into the second category, substituting the at least one subcount for the count of each item feature depends on whether the item was classified into the first category.

3. The computerized method of claim 1, wherein
    for first and second categories, classifying the item into the second category depends at least in part on a determination of whether the item was classified into the first category.

4. The computerized method of claim 1, wherein the classifying further comprises:
    comparing a category score for a first item in a first perspective with a category score for said first item in a second perspective; and
    modifying the category score in the first perspective in response to the category score in the second perspective.

5. The computerized method of claim 4, wherein said first perspective is an ancestor of said second perspective.

6. The computerized method of claim 4, wherein the comparing further comprises: creating an ordered list of category scores for all categories in all perspectives;
    identifying an item associated with a highest category score in a first perspective;
    identifying said item in a second perspective; and
    decreasing the category score of said item in said second perspective.

7. The computerized method of claim 6, further comprising repeating the identifying and decreasing for every perspective.

8. The computerized method of claim 1, wherein the weight corresponding to said concept node feature is between −1 and 1.

9. The computerized method of claim 1, in which the multiplying includes using at least one attribute of at least one category vector in determining whether to include a document feature of the feature vector in the multiplying.

10. The computerized method of claim 9, in which the using at least one attribute includes using at least one of:
    a Stop attribute to indicate whether a feature must constitute something other than a stop word to be included in the multiplying;
    a Case attribute to indicate whether a feature must match a letter case specification to be included in the multiplying;
    a Stemming attribute to indicate whether a feature includes stemmed word forms to be included in the multiplying; and
    a Learned attribute to indicate how a human-specified feature is to be included in the multiplying.

11. The computerized method of claim 9, in which the perspective to which the category relates determines the value of the at least one attribute.

* * * * *

UNITED STATES PATENT AND TRADEMARK OFFICE
CERTIFICATE OF CORRECTION

PATENT NO. : 7,028,250 B2
APPLICATION NO. : 09/864156
DATED : April 11, 2006
INVENTOR(S) : Ukrainczyk et al.

It is certified that error appears in the above-identified patent and that said Letters Patent is hereby corrected as shown below:

On the Title page, item (56), under "Foreign Patent Documents", in column 2, line 1, after "6/1995" insert -- G06F 15/18 --.

Signed and Sealed this

Eighteenth Day of July, 2006

JON W. DUDAS
*Director of the United States Patent and Trademark Office*